(12) United States Patent
Madams (10) Patent No.: US 12,299,803 B2
(45) Date of Patent: May 13, 2025

(54) HIGH PRECISION NORMAL MAP COMPRESSION USING WRAPPED OCTAHEDRAL MAPPING

(71) Applicant: Sony Interactive Entertainment LLC, San Mateo, CA (US)

(72) Inventor: Thomas Madams, Seattle, WA (US)

(73) Assignee: Sony Interactive Entertainment LLC, San Mateo, CA (US)

(*) Notice: Subject to any disclaimer, the term of this patent is extended or adjusted under 35 U.S.C. 154(b) by 63 days.

(21) Appl. No.: 18/475,884

(22) Filed: Sep. 27, 2023

(65) Prior Publication Data

US 2025/0104327 A1 Mar. 27, 2025

(51) Int. Cl.
*G06T 15/04* (2011.01)

(52) U.S. Cl.
CPC .......... *G06T 15/04* (2013.01); *G06T 2210/12* (2013.01)

(58) Field of Classification Search
CPC ............................. G06T 15/04; G06T 2210/12
See application file for complete search history.

(56) References Cited

U.S. PATENT DOCUMENTS

| | | | | |
|---|---|---|---|---|
| 2013/0084018 A1* | 4/2013 | Nystad | ....................... | G06T 9/00 382/232 |
| 2013/0121613 A1* | 5/2013 | Winnemoeller | ...... | G06F 3/0484 382/254 |
| 2014/0152662 A1* | 6/2014 | Nowrouzezahrai | ..... | G06T 15/06 345/426 |
| 2018/0268570 A1* | 9/2018 | Budagavi | ................ | G06T 9/001 |

OTHER PUBLICATIONS

Cigolle et al., Survey of Efficient Representations for Independent Unit Vectors, URL: https://jcgt.org/published/0003/02/01/, Journal of Computer Graphics Techniques, vol. 3, No. 2, 2014 (Year: 2014).*
Narkowicz, Octahedron normal vector encoding, URL: https://knarkowicz.wordpress.com/2014/04/16/octahedron-normal-vector-encoding/, 2014 (Year: 2014).*
John White 3D, Signed Octahedron Normal Encoding, URL: https://johnwhite3d.blogspot.com/, Oct. 2020 (Year: 2020).*
"International Search Report and Written Opinion", dated Oct. 16, 2024, from the counterpart PCT application PCT/US24/36049.

* cited by examiner

*Primary Examiner* — Phuc N Doan
(74) *Attorney, Agent, or Firm* — Fish & Richardson P.C.

(57) ABSTRACT

Techniques are described for encoding a normal map of a computer graphics texture. identify a normal map associated with a computer graphics texture. X and Z components of the normal map are associated with respective first and second channels with each channel being represented as two respective pair of endpoint values and 6-bits of interpolation indices. The channels including negative Z values are projected to octahedral space with interpolated index values being allowed outside the range of [−1, 1], and a symmetry operation executed to bring the interpolation indices values into the range [−1, 1].

20 Claims, 9 Drawing Sheets

Modes 0, 1, 2

| 31 30 29 28 27 26 25 24 | 23 22 21 20 19 18 17 16 | 15 14 13 12 11 10 9 8 | 7 6 5 4 3 | 2 1 0 |
|---|---|---|---|---|
| Center$_y$ | Center$_x$ | Size$_y$ | Size$_x$ | Mode |
| Indices | | | | |
| Indices | | | | |
| Indices | | | | |

FIG. 8

Mode 3

| 31 30 29 28 27 26 25 24 | 23 22 21 20 19 18 17 16 | 15 14 13 12 11 10 9 8 | 7 6 5 4 3 | 2 1 0 |
|---|---|---|---|---|
| Center$_y$ | Center$_x$ | Size$_y$ | Size$_x$ | Mode |
| Indices | | | | |
| Indices | | | | |
| Indices | | | | |

FIG. 9

Mode 4

| 31 30 29 28 27 26 25 24 | 23 22 21 20 19 18 17 16 | 15 14 13 12 11 10 9 8 | 7 6 5 4 | 3 2 | 1 0 |
|---|---|---|---|---|---|
| $Extents_{y1}$ | $Extents_{x1}$ | $Extents_{y0}$ | $Extents_{x0}$ | Partition | 0 | Mode |
| $Center_{y1}$ | $Center_{x1}$ | $Center_{y0}$ | $Center_{x0}$ | | | |
| $Indices_x$ | | | | | | |
| $Indices_y$ | | | | | | |

Mode 5

| 31 30 29 28 27 26 25 24 | 23 22 21 20 19 18 17 16 | 15 14 13 12 11 10 9 8 | 7 6 5 4 | 3 2 | 1 0 |
|---|---|---|---|---|---|
| $Extents_{x1}$ | $Extents_{y0}$ | $Extents_{x0}$ | $Extents_{y1}$ | Partition | 1 | Mode |
| $Center_{x1}$ | $Center_{y0}$ | $Center_{x0}$ | $Center_{y1}$ | | | $Extents_{x1}$ |
| $Indices_{shared}$ | | | | | | |
| $Indices_{shared}$ | | | | | | |

HIGH PRECISION NORMAL MAP COMPRESSION USING WRAPPED OCTAHEDRAL MAPPING

FIELD

The present application relates to technically inventive, non-routine solutions that are necessarily rooted in computer technology and that produce concrete technical improvements, and more specifically to using octahedral space for normal map encoding.

BACKGROUND

In computer simulations such as computer gaming, objects are rendered in part using "texture" data that describes the surfaces of the objects. The more texture data for a given object, the higher resolution the rendering can be. However, for bandwidth purposes it is desirable not to send large texture data structures to a rendering device.

SUMMARY

As understood herein, textures may include the parameter of "normal". A normal map defines the small shape detail for the surface, specifically representing the surface normal of the underlying surface.

In typical applications, XYZ normal map values are required to be normalized before they can be used; that is $X*X+Y*Y+Z*Z=1$. Consequently, storing all three X, Y and Z components is not necessary, since the points all lie on the surface of a unit radius sphere.

As understood herein, one transform to convert 3-component normal map XYZ values to 2-component XY values that allow the original normalized XYZ value to be reconstructed whose inverse is amenable to hardware implementation is the octahedral transform. This transform projects the original XYZ value onto the surface of a unit sphere, and from there onto an octahedron centered at the origin whose unfolded net is composed of 8 isosceles triangles of side lengths (1, 1, sqrt(2)). The XY values in this octahedral space are valid in the range [−1, 1].

According to present principles, an example XYZ to octahedral transform may be expressed as:

```
float2 signNotZero(float2 v) {
   float signX, signY;
   if (v.x>=0) signX=1; else signX=-1;
   if (v.y>=0) signY=1;
   else sign Y=-1;
   return {signX, signY};
}
float2 XyzToOctahedral(float3 v) {
   v=v/sqrt (v.x*v.x+v.y*v.y+v.z*v.z);
   float2 p=v.xy*(1/(abs(v.x)+abs(v.y)+abs(v.z)));
   if (v.z<=0)
      {return (1-abs(p.yx))*signNotZero(p); //Note the
         change of order of components in p.yx
   } else {
      return p;
   }
}
```

Present principles understand that a fundamental problem with this transform is that it is possible for XYZ values that were close together in the original normal map to become far apart once transformed to octahedral space. This makes these values difficult to compress accurately using existing GPU block compression formats like BC5 (even though it is specifically designed to encode 2-component XY textures).

Accordingly, present techniques, instead of storing the endpoints explicitly, store "center" and "extents" values that may be calculated as follows in example embodiments:

$$\text{center}=(\text{endpoint\_0}+\text{endpoint\_1})/2$$

$$\text{extents}=(\text{endpoint\_1}-\text{endpoint\_0})/2$$

Note that this is an invertible transformation from which the original endpoint values can be recovered.

This transformation allows values outside the range [−1, 1] to be represented.

Accordingly, an apparatus includes at least one processor assembly configured to identify a normal map associated with a computer graphics texture. The processor assembly is configured to associate X and Z components of the normal map with respective first and second channels with each channel being represented as two respective pair of endpoint values and 6-bits of interpolation indices. The processor assembly is configured to project the first and second channels including negative Z values to octahedral space with interpolated index values being allowed outside the range of [−1, 1], and execute at least one symmetry operation to bring the interpolation indices values into the range [−1, 1].

If desired the processor assembly can be configured to store a result of the symmetry operation and/or transmit a result of the symmetry operation to at least one receiver such that the receiver can decode the result of the symmetry operation for presentation of the texture on a video display. The apparatus may include the receiver.

In non-limiting examples the processor assembly may be configured to dynamically assign bits of the interpolation indices to the first or second channel based on an aspect ratio (AR) of a bounding box formed by the pair of endpoint values, where $AR=(y_{max}-y_{min})/(x_{max}-x_{min})$ of the bounding box, where "max" and "min" indicate respective maximum and minimum values. In such examples the processor assembly can be configured to solve at least one boundary discontinuity solved by storing center and extent values for the bounding box instead of minimum and maximum values. Also, if desired the processor assembly may be configured to rotate a coordinate frame of the bounding box by fixed increments to produce a smaller bounding box.

In another aspect, a device includes at least one computer storage that is not a transitory signal and that in turn includes instructions executable by at least one processor assembly to identify a normal map associated with a computer graphics texture, and associate components of the normal map with respective channels each being represented as two respective pair of endpoint values and bits of interpolation indices. The instruction are executable to project the channels including negative Z values to octahedral space with interpolated index values being allowed outside the range of [−1, 1]. The instructions also are executable to execute at least one symmetry operation to bring the interpolation indices values into the range [−1, 1].

In another aspect, a method includes projecting into octahedral space at least two components of a normal map associated with a computer graphics texture. The components include endpoint values and bits of interpolation indices and at least one component includes negative Z values from the normal map. Values of the interpolation indices are allowed to be outside the range of [−1, 1]. The method includes executing at least one symmetry operation to bring the values of the interpolation indices into the range [−1, 1].

The details of the present disclosure, both as to its structure and operation, can be best understood in reference to the accompanying drawings, in which like reference numerals refer to like parts, and in which:

DETAILED DESCRIPTION

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, extended reality (XR) headsets such as virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers. A processor including a digital signal processor (DSP) may be an embodiment of circuitry. A processor assembly may include one or more processors.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

Figure 1:
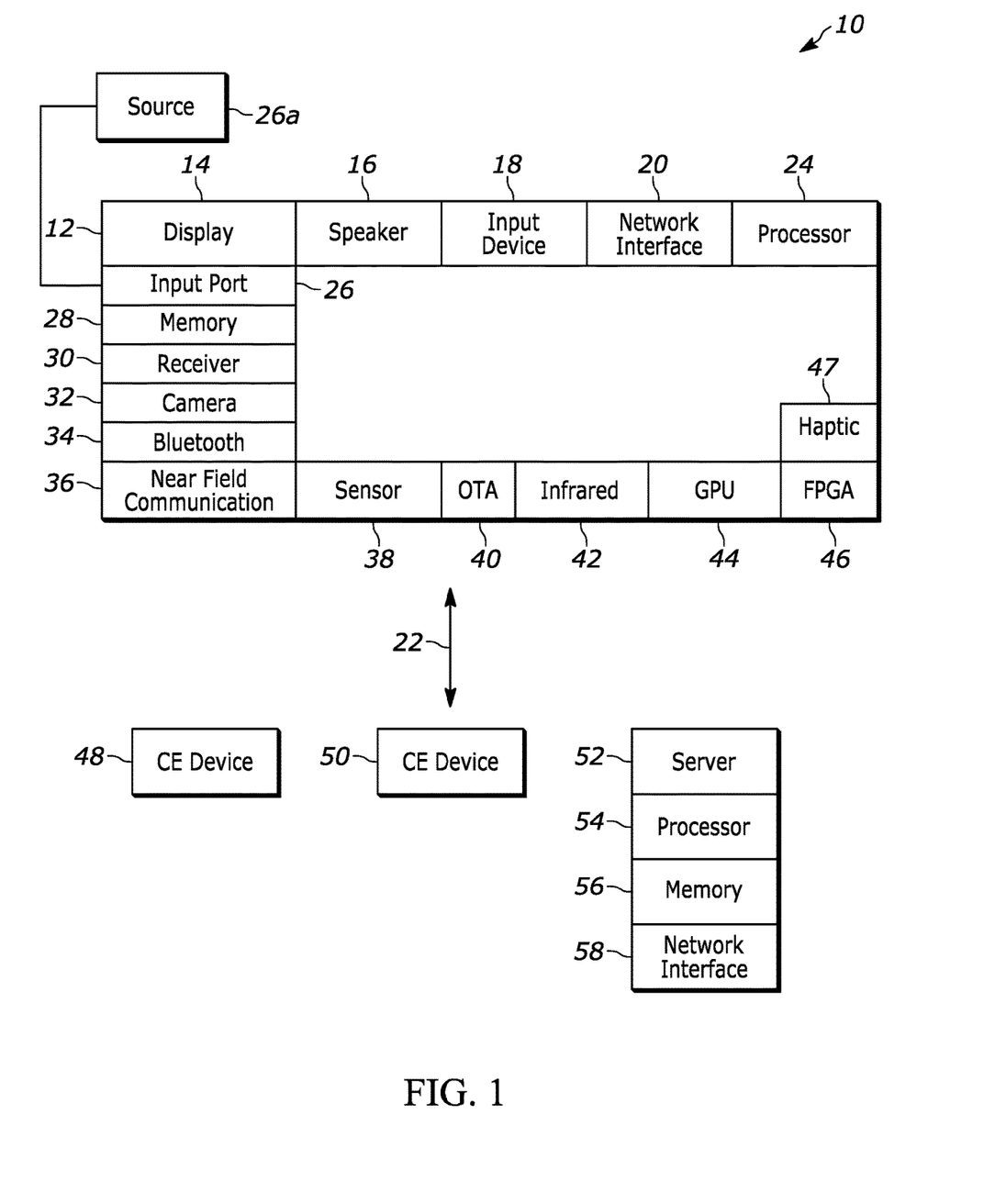
FIG. 1 is a block diagram of an example system including an example in consistent with present principles.

Referring now to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to a theater display system which may be projector-based, or an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories/computer-readable storage media 28 such as disk-based or solid-state storage that are not transitory signals, in some cases embodied in the chassis of the AVD as stand-alone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24.

Continuing the description of the AVD 12, in some embodiments the AVD 12 may include one or more cameras 32 that may be a thermal imaging camera, a digital camera such as a webcam, an IR sensor, an event-based sensor, and/or a camera integrated into the AVD 12 and controllable by the processor 24 to gather pictures/images and/or video in accordance with present principles. Also included on the AVD 12 may be a Bluetooth® transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc. Other sensor examples include a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command). The sensor 38 thus may be implemented by one or more motion sensors, such as individual accelerometers, gyroscopes, and magnetometers and/or an inertial measurement unit (IMU) that typically includes a combination of accelerometers, gyroscopes, and magnetometers to determine the location and orientation of the AVD 12 in three dimension or by an event-based sensors such as event detection sensors (EDS). An EDS consistent with the present disclosure provides an output that indicates a change in light intensity sensed by at least one pixel of a light sensing array. For example, if the light sensed by a pixel is decreasing, the output of the EDS may be −1; if it is increasing, the output of the EDS may be a +1. No change in light intensity below a certain threshold may be indicated by an output binary signal of 0.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions. A light source such as a projector such as an infrared (IR) projector also may be included.

In addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content (more generally, extended reality (XR) content). The HMD may be configured as a glasses-type display or as a bulkier VR-type display vended by computer game equipment manufacturers.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown or nearby.

The components shown in the following figures may include some or all components shown in herein. Any user interfaces (UI) described herein may be consolidated and/or expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Generative pre-trained transformers (GPTT) also may be used. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Figure 2:
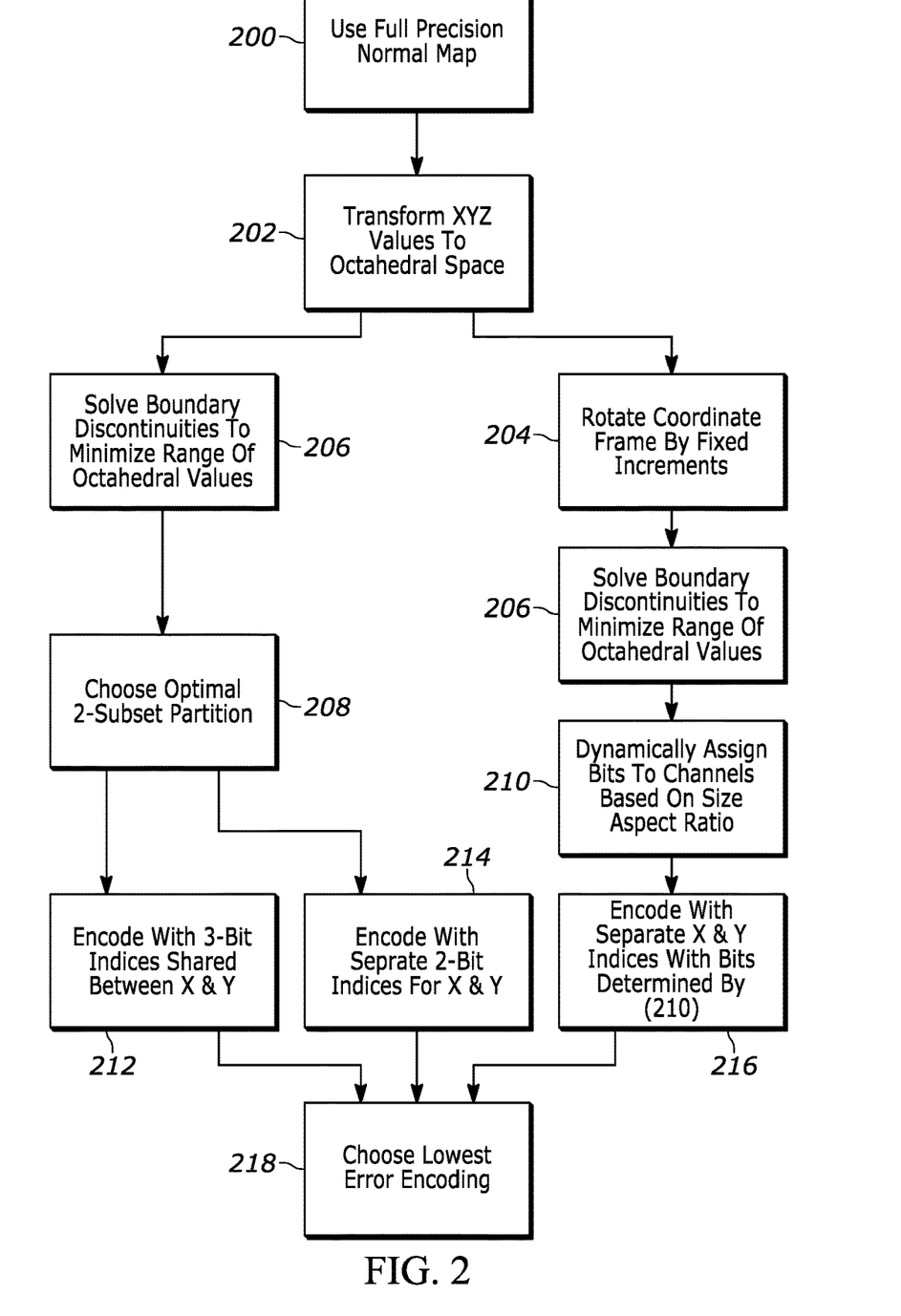
FIG. 2 illustrates example overall logic in example flow chart format.

Prior to turning to FIG. 2, "textures" are data structures that can be mapped onto images to characterize the surfaces of the rendered objects. The basic data element of a texture data structure is a texture element or texel (combination of texture and pixel). Textures are represented by arrays of texels representing the texture space. The texels are mapped to pixels in an image to be rendered to define the rendered surface of the image.

Various types of compression may be used on textures. One type is block compression, sometimes expressed as BCn compression that is a lossy texture compression which can be decompressed in-place by graphics processing units (GPUs). Block compression does not require the whole image to be decompressed, so the GPU can decompress the data structure while sampling the texture as though it was not compressed at all.

Block compression techniques compress 4×4 blocks of pixels into a single (smaller) data packet. Generally, this involves selecting two or more (depending on the BC compression type) "endpoint" colors with some information per-pixel about how to blend between those two colors at each pixel. The endpoint colors are shared for the entire 4×4 pixel block. For instance, for an image of only red, blue, and purple pixels, the compressor would likely choose one end point to be red, and the other blue. The purple pixels would have values that blend the two together.

Commencing at block 200 in FIG. 2, the desired outcome is indicated as use of normal map of 8-bits per component or higher.

Moving to state 202, the XYZ values are projected to octahedral space. An octahedral space is obtained from an octahedron by identifying its opposite triangular faces, positioned at an angle of $\pi/3$ to each other. An octahedral space is a three-dimensional manifold and is the orbit space of the action of a binary octahedral group on a three-dimensional sphere. However, present principles allow interpolated points to be outside the valid octahedral range of [−1, 1], achieving much smaller bounds for those values.

Figure 3:
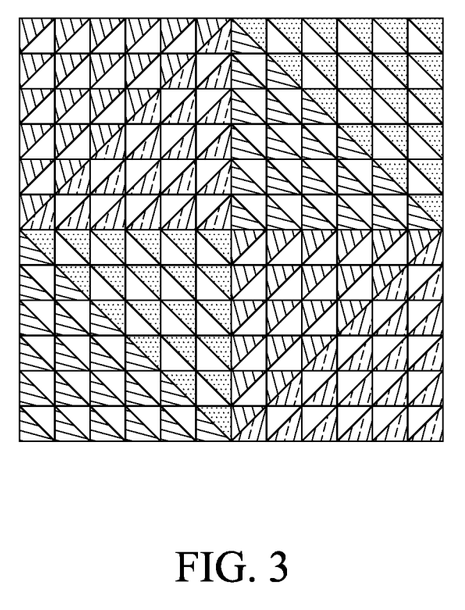
FIGS. 3-5 illustrate example octahedral space.
Figure 4:
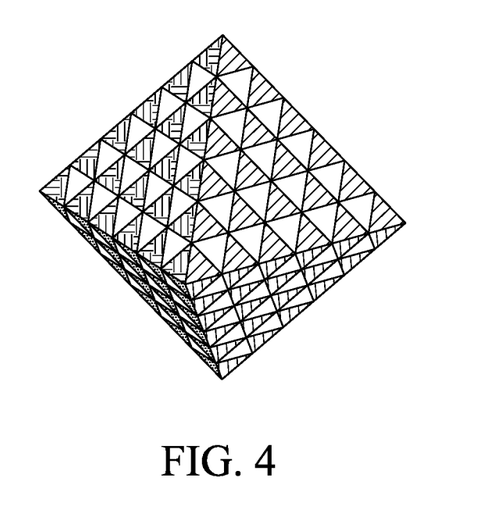
Figure 5:
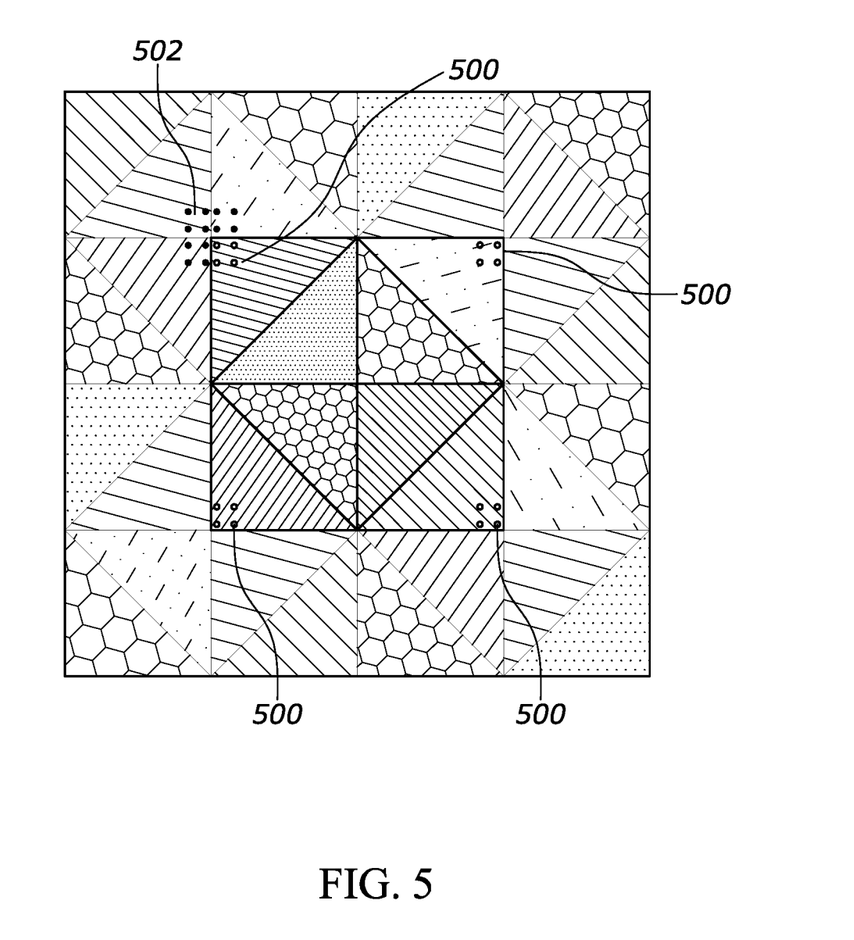
Figure 6:
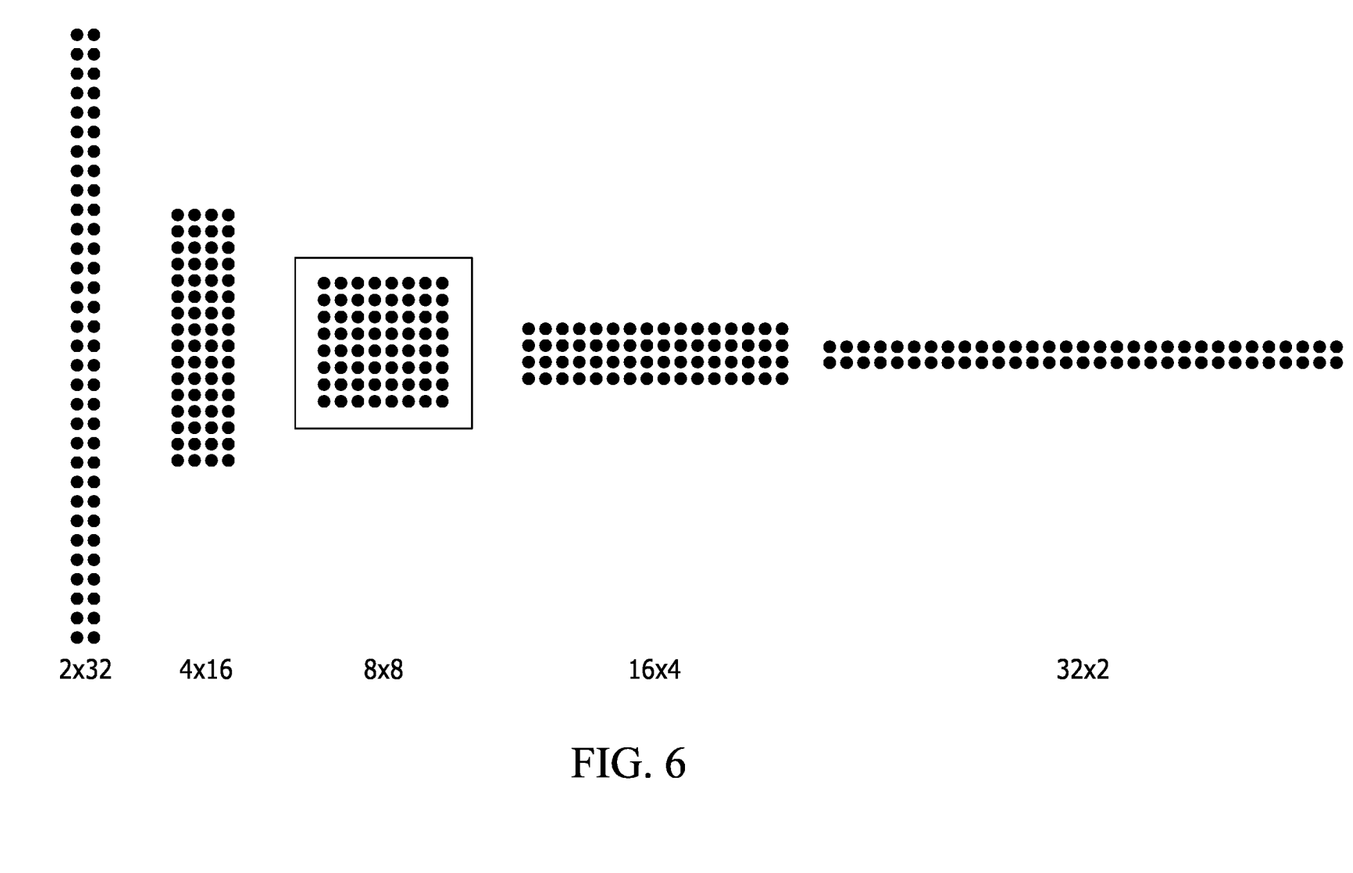
FIG. 6 illustrates dynamic bit allocation to channels.

FIGS. 3, 4, and 5 provide representations of an octahedral space. Of particular note is FIG. 5, which illustrates point locations 500 in the positions they would have in octahedral space (relatively spread out) were values outside the range [−1, 1] not allowed, and much more tightly clustered point locations 502 that result from allowing values outside the [−1, 1] range. The example of FIG. 5 illustrates the distribution of points in octahedral space for sixteen (16) values clustered around (0, 0, −1).

Figure 7:
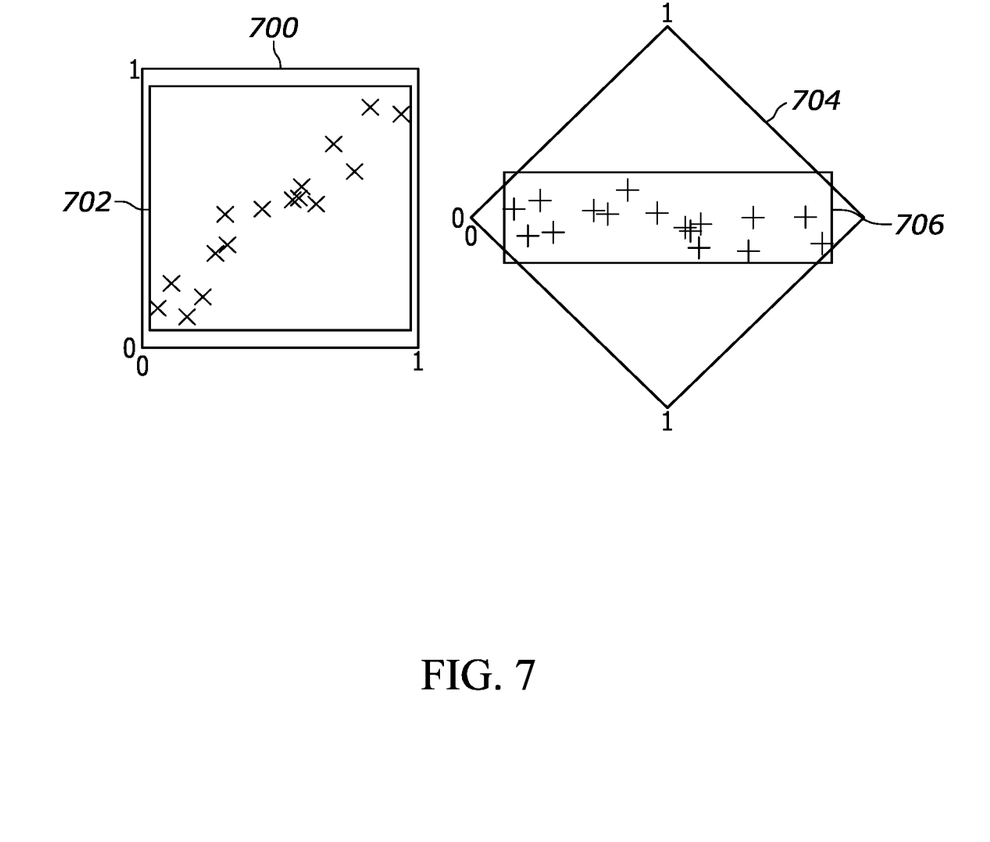
FIG. 7 illustrates coordinate frame rotation for interpolation.

State 204 indicates and FIG. 7 illustrates that the coordinate frame 700 of a bounding box 702 may be rotated by fixed increments as indicated at 704 to find a relatively "tighter" (smaller) bounding box 706, which improves encoding precision. Using a single extra bit, an angle can be selected in the set $\{0,\pi/4\}$, and two bits can either increase the set to $\{0,\pi/8,\pi/4,3\pi/8\}$ if all potential bit combinations are used. Alternatively, two bits can increase the set to three values $\{0,\pi/6,\pi/3\}$, leaving the fourth possible 2-bit value to signal the use of a multi-subset encoding (state 208).

Moving to state 206, boundary discontinuities are solved by storing center and extent values for the bounding box instead of minimum and maximum values. "Pixel extent" is determined by identifying the minimum and maximum values of a channel from all pixels in a subset, and subtracting the minimum from the maximum. Pixel extent thus is a measure of the range of colors in a block or subset. A block or subset with small extent will be more uniform in color than one with large extent.

Figure 11:
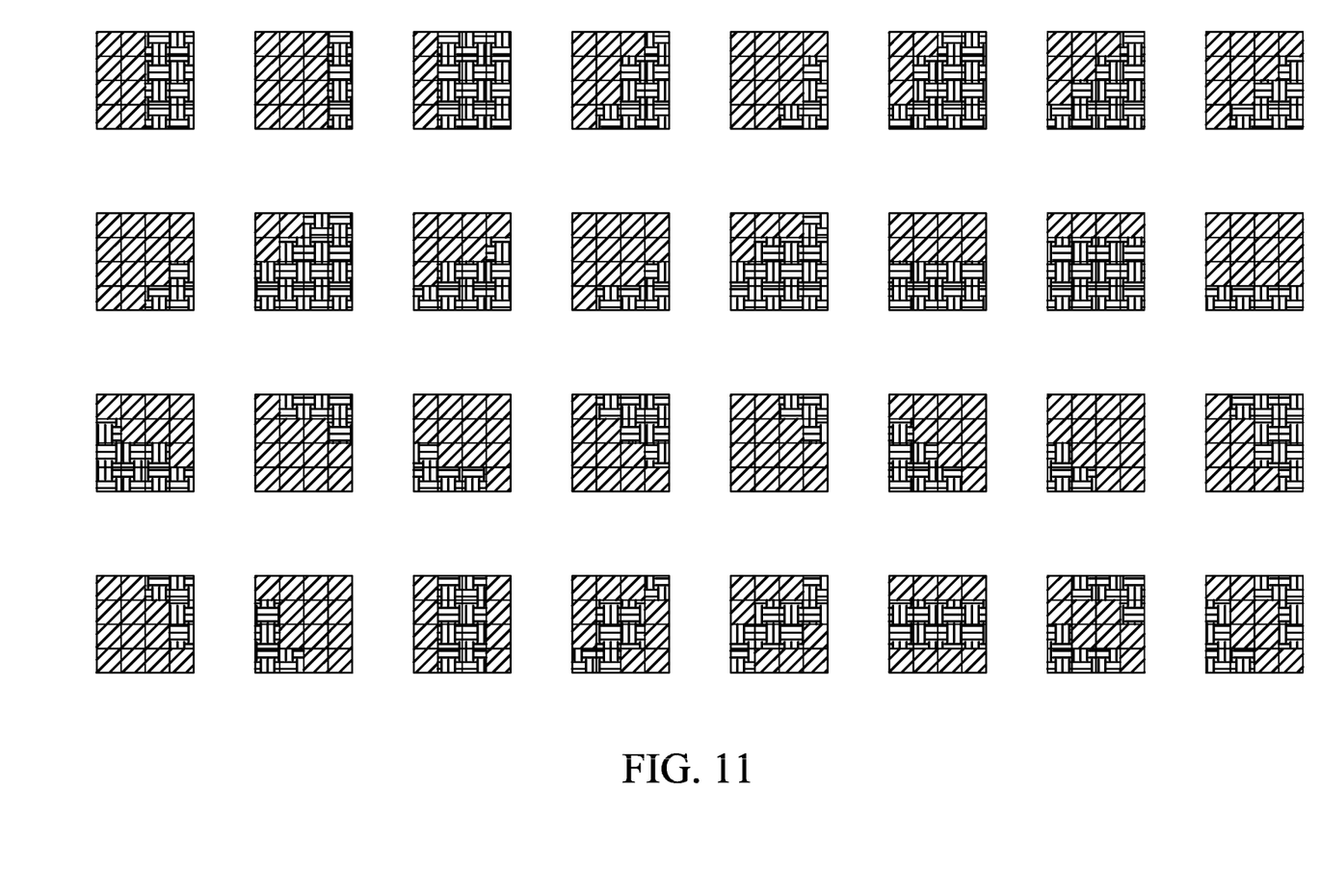
FIG. 11 illustrates 32 potential partition patterns that may be used to divide a block into two subsets.

At state 208, the 4×4 block of octahedral values is partitioned into 2 subsets following one of 32 different predefined patterns. For example, the first 32 patterns from the 2-subset BC7 specification might be used (see FIG. 11). For each subset, the optimal center and extends are chosen, as in state 206.

At state 210, interpolation bits are dynamically assigned to channels based on the aspect ratio (AR) of the bounding box formed by the endpoint pairs, where AR=(ymax−ymin)/(xmax−xmin) of the bounding box, where "max" and "min" indicate respective maximum and minimum values. No extra bits are needed to signal this, since the point distribution is automatically triggered by the AR.

States 212 and 214 indicate encoding the 2-subset partitioned values in one of two formats.

At state 214, endpoints are encoded as center and extents, and each pixel in the 4×4 block is assigned a pair of indices which interpolate from xmin to xmax, and from ymin to ymax, where (xmin, ymin)=center−extents and (xmax, ymax)=center+extents.

At state 214, endpoints are encoded as center and extents, and each pixel in the 4×4 block is assigned a single index which interpolations from (xmin, ymin) to (xmax, ymax), where (xmin, ymin)=center−extents and (xmax, ymax)=center+extents.

At state 216, endpoints are encoded as center and extents, and each pixel in the 4×4 block is assigned a pair of indices whose exact bit allocation was determined at state 210. The first index interpolates from xmin to xmax and the second index interpolates from ymin to ymax.

Again note that in states 212, 214, and 216, interpolated values are allowed outside of the valid octahedral range [−1, 1]. Simple symmetry operations are then used to bring values back into the valid range.

At state 218, the results of states 212, 214, and 216 are decoded and their encode error calculated using present techniques (e.g. root-mean-square error) and the result with the lowest error is chosen as the encoding for the block.

A non-limiting example of simple symmetry operations may be summarized as given a surface mesh M, a geometry image/is created that approximates the surface mesh. A spherical parametrization is first created of the surface (S→M). Next, a spherical parametrization (S→D) of a domain polyhedron D is created, chosen to be a tetrahedron, an octahedron, or a cube. Finally, the domain is unfolded into the image (D→I). All these maps are invertible, and their composition provides a map I→D→S→M. For remeshing, the domain polyhedron is uniformly sampled at the vertices of a regular n-tessellation (n+1 vertices on each domain edge). To avoid undersampling of the surface mesh, the stretch of the map D→M is minimized by minimizing stretch on the two maps D→S and S→M, both of which maps involve the computation of a spherical parametrization. A spherical parametrization depends on a given triangle mesh M, and a form a continuous invertible map φ: S→M is formed from the unit sphere to the mesh. The map is specified by assigning each mesh vertex v a parametrization φ−1(v)∈S. Each mesh edge is mapped to a great circle arc, and each mesh triangle is mapped to a spherical triangle bounded by these arcs.

An example simple renormalization is code is shown below (floating point used for clarity, but fixed point implementation is similar):

```
float2 renormalizeOct(float2 o) {
    if (abs(o.x) > 1) {
        if (abs(o.y) > 1) {
            o = {
                o.x − copysign(2, o.x),
                o.y − copysign(2, o.y),
            };
        } else {
            o = { copysign(2, o.x) − o.x, −o.y };
        }
    } else if (abs(o.y) > 1) {
        o = { −o.x, copysign(2, o.y) − o.y };
    }
    return o;
```

Renormalization preferably may be performed in the texture sampler.

Figure 8:
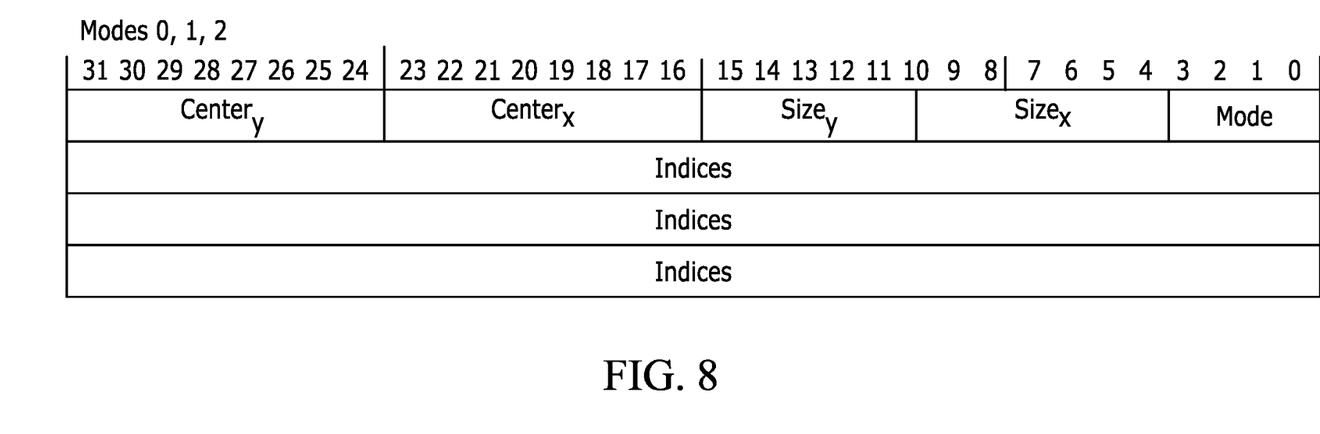
FIG. 8 illustrates bit assignments for three coordinate frame rotation modes.
Figure 9:
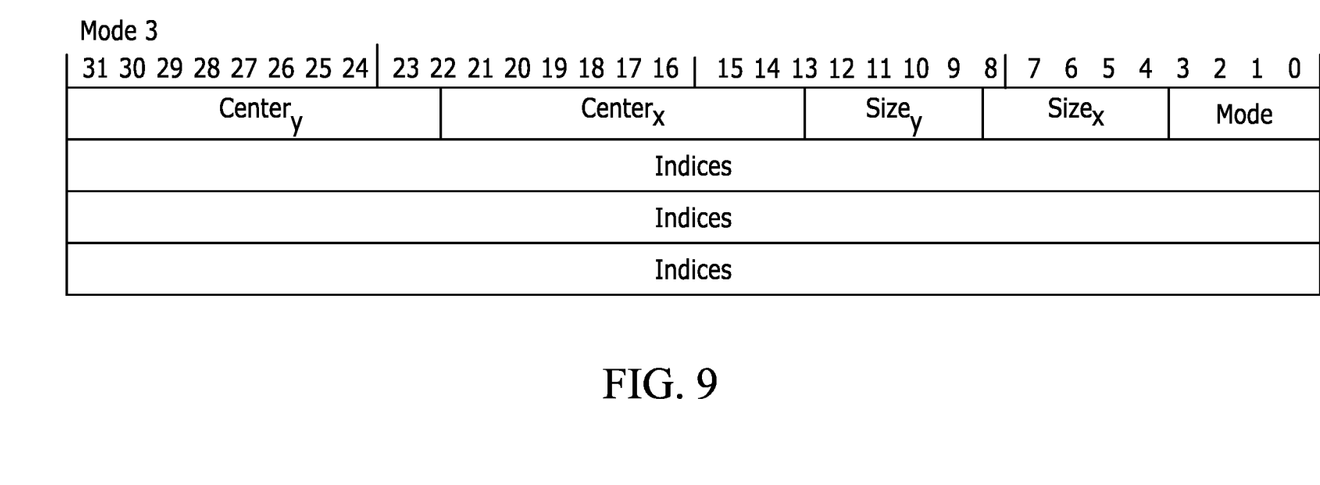
FIG. 9 illustrates a bit assignment for a fourth mode in which no coordinate frame rotation is used.
Figure 10:
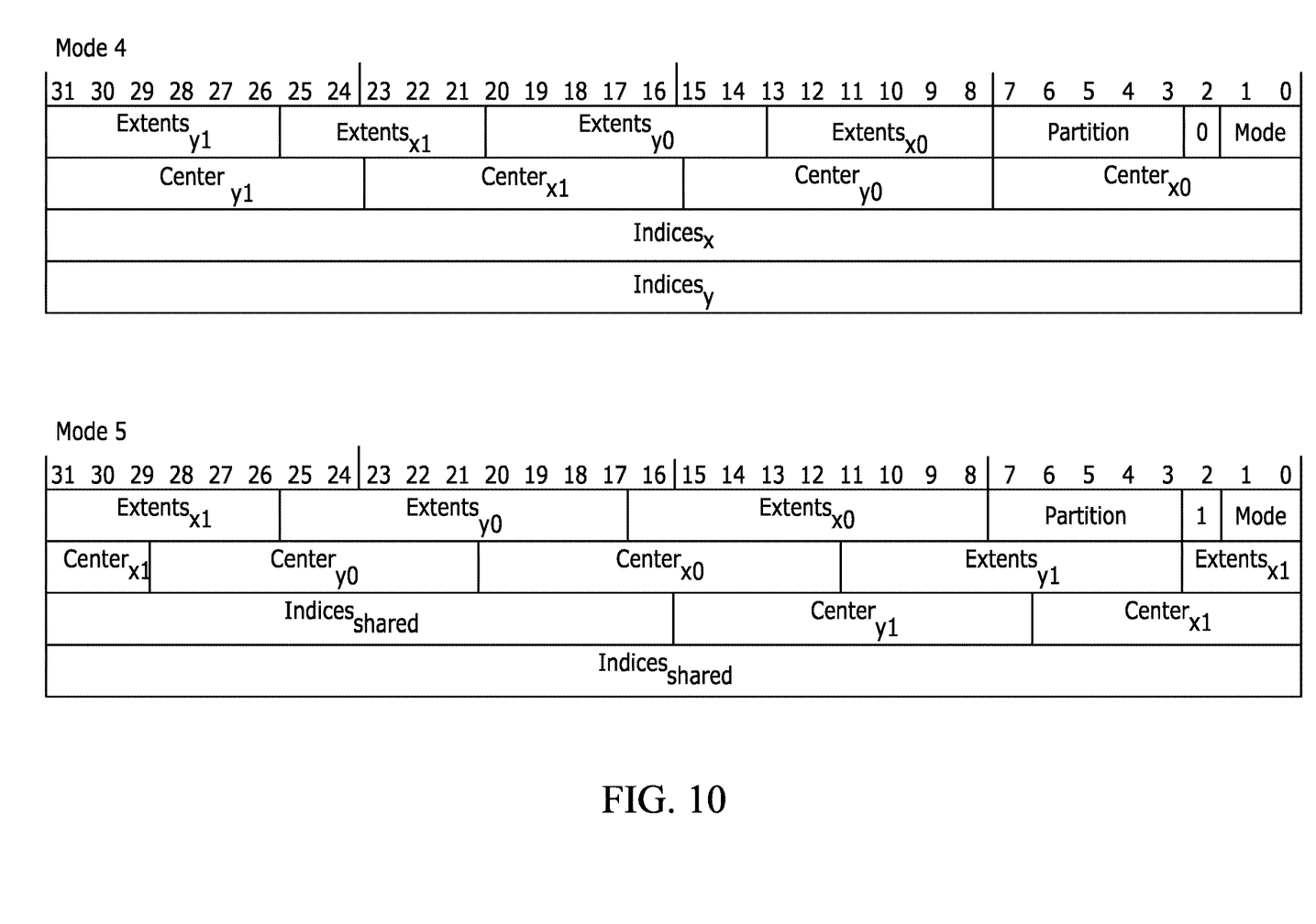
FIG. 10 illustrates a bit assignment for a fifth and sixth mode in which the block is partitioned into two subsets.

From state 210 present techniques proceed to state 212 to pack bits into 8-bits per pixel. In an example, and referring to FIGS. 8 and 9, there may be three modes (labeled 0, 1, and 2 in FIG. 8) to choose from between predefined coordinate frame rotations and a fourth mode (labeled mode 3 in FIG. 9) that, as shown, allocates more bits for the center than for size for improved precision in smooth regions, with no coordinate frame rotation for mode 3. Alternatively, a fourth and fifth mode (labeled mode 4 and mode 5 in FIG. 10) support partitioning a block into 2-subsets following a predefined pattern (labeled "partition" in FIG. 10), with fewer bits allocated to the endpoints and indices.

The above compressed representations of normal maps may be stored and/or transmitted to a receiver that may be implemented by any device for example shown in FIG. 1 to reverse the relevant encodings in a decoding process and display the associated texture in a computer simulation such as a computer game.

While particular techniques are herein shown and described in detail, it is to be understood that the subject matter which is encompassed by the present application is limited only by the claims.

What is claimed is:

1. An apparatus comprising:
   at least one processor assembly configured to:
   identify a normal map associated with a computer graphics texture;
   associate X and Z components of the normal map with respective first and second channels with each channel being represented as two respective pair of endpoint values and 6-bits of interpolation indices;
   project the first and second channels including negative Z values to octahedral space with interpolated index values being allowed outside the range of [−1, 1]; and
   execute at least one symmetry operation to bring the interpolation indices values into the range [−1, 1].

2. The apparatus of claim 1, wherein the processor assembly is configured to store a result of the symmetry operation.

3. The apparatus of claim 1, wherein the processor assembly is configured to transmit a result of the symmetry operation to at least one receiver such that the receiver can decode the result of the symmetry operation for presentation of the texture on a video display.

4. The apparatus of claim 3, comprising the receiver.

5. The apparatus of claim 1, wherein the processor assembly is configured to:
   dynamically assign bits of the interpolation indices to the first or second channel based on an aspect ratio (AR) of a bounding box formed by the pair of endpoint values, where $AR=(y_{max}-y_{min})/(x_{max}-x_{min})$ of the bounding box, where "max" and "min" indicate respective maximum and minimum values.

6. The apparatus of claim 5, wherein the processor assembly is configured to:
   solve at least one boundary discontinuity solved by storing center and extent values for the bounding box instead of minimum and maximum values.

7. The apparatus of claim 5, wherein the processor assembly is configured to:
   rotate a coordinate frame of the bounding box by fixed increments to produce a smaller bounding box.

8. A device comprising:
   at least one computer storage that is not a transitory signal and that comprises instructions executable by at least one processor assembly to:
   identify a normal map associated with a computer graphics texture;
   associate components of the normal map with respective channels each being represented as two respective pair of endpoint values and bits of interpolation indices;
   project the channels including negative Z values to octahedral space with interpolated index values being allowed outside the range of [−1, 1]; and
   execute at least one symmetry operation to bring the interpolation indices values into the range [−1, 1].

9. The device of claim 8, wherein the instructions are executable to store a result of the symmetry operation.

10. The device of claim 8, wherein the instructions are executable to transmit a result of the symmetry operation to at least one receiver such that the receiver can decode the result of the symmetry operation for presentation of the texture on a video display.

11. The device of claim 10, comprising the receiver.

12. The device of claim 8, wherein the instructions are executable to:
    dynamically assign bits of the interpolation indices to the first or second channel based on an aspect ratio (AR) of a bounding box formed by the pair of endpoint values, where $AR=(y_{max}-y_{min})/(x_{max}-x_{min})$ of the bounding box, where "max" and "min" indicate respective maximum and minimum values.

13. The device of claim 12, wherein the instructions are executable to:
solve at least one boundary discontinuity solved by storing center and extent values for the bounding box instead of minimum and maximum values.

14. The device of claim 12, wherein the instructions are executable to:
rotate a coordinate frame of the bounding box by fixed increments to produce a smaller bounding box.

15. A method, comprising:
projecting into octahedral space at least two components of a normal map associated with a computer graphics texture, the components comprising endpoint values and bits of interpolation indices and at least one component comprising negative Z values from the normal map and values of the interpolation indices outside the range of [−1, 1]; and
executing at least one symmetry operation to bring the values of the interpolation indices into the range [−1, 1].

16. The method of claim 15, comprising storing a result of the symmetry operation.

17. The method of claim 15, comprising transmitting a result of the symmetry operation to at least one receiver such that the receiver can decode the result of the symmetry operation for presentation of the texture on a video display.

18. The method of claim 15, comprising:
dynamically assigning bits of the interpolation indices to a first or second channel to be projected into octahedral space based on an aspect ratio (AR) of a bounding box formed by the pair of endpoint values, where AR= $(y_{max}-y_{min})/(x_{max}-x_{min})$ of the bounding box, where "max" and "min" indicate respective maximum and minimum values.

19. The method of claim 18, comprising:
solving at least one boundary discontinuity solved by storing center and extent values for the bounding box instead of minimum and maximum values.

20. The method of claim 18, comprising:
rotating a coordinate frame of the bounding box by fixed increments to produce a smaller bounding box.

* * * * *